United States Patent
Engel

(10) Patent No.: US 7,499,818 B2
(45) Date of Patent: Mar. 3, 2009

(54) FLEXIBLE SAMPLING PLANS AND USER INTERFACE FOR COORDINATE MEASURING MACHINES

(75) Inventor: Richard L. Engel, Grand Blanc, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/416,910

(22) Filed: May 3, 2006

(65) Prior Publication Data

US 2007/0260416 A1 Nov. 8, 2007

(51) Int. Cl.
*G01N 37/00* (2006.01)
(52) U.S. Cl. .......................................... 702/83
(58) Field of Classification Search ................. 702/152, 702/83
See application file for complete search history.

(56) References Cited

U.S. PATENT DOCUMENTS

| | | | | |
|---|---|---|---|---|
| 4,270,863 A | * | 6/1981 | Trogdon | 356/71 |
| 5,465,221 A | * | 11/1995 | Merat et al. | 702/83 |
| 6,477,432 B1 | * | 11/2002 | Chen et al. | 700/51 |
| 6,914,665 B2 | * | 7/2005 | Ishikawa | 355/53 |
| 2004/0107062 A1 | * | 6/2004 | Lawrence | 702/83 |

* cited by examiner

*Primary Examiner*—Bryan Bui
*Assistant Examiner*—Jonathan Teixeira Moffat

(57) ABSTRACT

A system for developing sampling plans includes a coordinate measuring machine (CMM) that inspects features of objects. The system includes an input module that is used to input inspection criteria to generate a sampling plan for said CMM and that is used to selectively modify said inspection criteria to develop multiple sampling plans. The system includes a storage device that stores said inspection criteria and a control module that controls the CMM using said inspection criteria.

19 Claims, 3 Drawing Sheets

| A Feature | B Group Frequency | C Group Start Cycle | D Feature Frequency | E Feature Start Cycle | Startup | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|---|---|
| H101 | | | 1/3 | 1 | X | | X | | | | | X | | | X | | | X | | | |
| H102 | | | 1/3 | 2 | X | | | | X | | | | X | | | X | | | | | X |
| H103 | | | 1/3 | 3 | X | | | | | | X | | | X | | | X | | | | |
| H104 | 1/2 | 2 | 1/1 | 1 | X | | X | | X | | X | | X | | X | | X | | X | | X |
| H201 | | | 1/2 | 1 | X | X | | | | | | X | | | X | | | X | | | X |
| H202 | | | 1/2 | 2 | X | | | | X | | | | X | | | X | | | | | |
| H203 | 1/3 | 1 | 1/1 | 1 | X | X | | X | | X | | X | | X | | X | | | X | | X |
| H301 | | | 1/4 | 1 | X | X | | | X | | | X | | | X | | | X | | | |
| H302 | | | 1/4 | 2 | X | | X | | | X | | | X | | | X | | | X | | |
| H303 | | | 1/4 | 3 | X | | | X | | | X | | | X | | | X | | | X | |
| H304 | | | 1/4 | 4 | X | | | | X | | | X | | | X | | | X | | | X |
| H305 | 1/1 | 1 | 1/1 | 1 | X | X | X | X | X | X | X | X | X | X | X | X | X | X | X | X | X |
| Total Inspections | | | | | 12 | 4 | 4 | 2 | 6 | 2 | 4 | 4 | 4 | 2 | 6 | 2 | 4 | 4 | 4 | 2 | 6 |

| A Feature | B Group Frequency | C Group Start Cycle | D Feature Frequency | E Feature Start Cycle | Startup | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|---|---|---|---|---|
| H101 | | | 1/3 | 1 | X | | X | | | | | | X | | X | | | | X | | | 4 |
| H102 | | | 1/3 | 2 | X | | | | X | | X | | | | | | X | | | | X | 4 |
| H103 | | | 1/3 | 3 | X | | | | | | X | | | | X | | X | X | | | X | 6 |
| H104 | 1/2 | 2 | 1/1 | 1 | X | | X | | X | | X | | X | | X | | X | | X | | X | 8 |
| H201 | | | 1/2 | 1 | X | | | | X | | | | | | X | | X | X | | | X | 6 |
| H202 | | | 1/2 | 2 | X | | | | X | | X | | | | X | | X | | | | X | 6 |
| H203 | 1/3 | 1 | 1/1 | 1 | X | | | | | | | X | | | | | | X | | | | 2 |
| H301 | | | 1/4 | 1 | X | X | | | | X | | | X | | | X | | | X | | | 4 |
| H302 | | | 1/4 | 2 | X | | X | | X | X | | X | | X | | X | | X | | X | | 8 |
| H303 | | | 1/4 | 3 | X | | | X | X | | X | X | X | X | X | X | X | X | X | | X | 12 |
| H304 | | | 1/4 | 4 | X | | | X | X | | X | X | X | X | X | X | X | X | X | X | X | 13 |
| H305 | 1/1 | 1 | 1/1 | 1 | X | X | X | X | X | X | X | X | X | X | X | X | X | X | X | X | X | 16 |
| Total Inspections | | | | | 12 | 4 | 4 | 2 | 6 | 2 | 4 | 4 | 4 | 2 | 6 | 2 | 4 | 4 | 4 | 2 | 6 | |

*FIG. 1*

FLEXIBLE SAMPLING PLANS AND USER INTERFACE FOR COORDINATE MEASURING MACHINES

FIELD OF THE INVENTION

The present invention relates to coordinate measuring machines, and more particularly to developing flexible sampling plans and user interface for coordinate measuring machines.

BACKGROUND OF THE INVENTION

Measuring dimensions of a manufactured object is necessary to verify whether the manufactured object conforms to design specifications. A coordinate measuring machine, commonly abbreviated as CMM, takes 3-dimensional measurements of an object. Typically, the machine uses a touch or scanning type probe that moves in a 3-dimensional space. The 3-dimensional coordinates of the object are measured by encoding the movement of the probe as the probe touches or scans the object.

Scanning probes acquire coordinate data, or measurements, of an object at varying scanning speeds. The accuracy of the measurements is generally higher at lower scanning speeds. Decreasing the scanning speed, however, reduces the number of objects that the CMM can inspect in a give time. The problem is compounded when the object has multiple features or elements that need to be accurately inspected.

SUMMARY OF THE INVENTION

A system for developing sampling plans comprises a coordinate measuring machine (CMM) that inspects features of objects, an input module that is used to input inspection criteria to generate a sampling plan for said CMM and that is used to selectively modify said inspection criteria to develop multiple sampling plans, a storage device that stores said inspection criteria, and a control module that controls the CMM using said inspection criteria.

In another feature, said inspection criteria comprises a number of inspection cycles in said sampling plan, frequencies to inspect said features and groups of said features, and inspection cycle numbers to begin inspecting said features and said groups.

In another feature, said input module comprises a computer screen that displays at least one of menu selections and commands.

In yet another feature, said input module comprises a computer terminal with at least one of a screen and a keyboard.

In another feature, said storage device stores group counters, feature counters, and an inspection cycle counter.

In yet another feature, at least one of said control module, said storage device, and said input module is implemented by a single module.

In still other feature, said CMM selectively comprises at least one of said control module, said storage device, and said input module.

In another feature, said control module initializes group counters with inspection cycle numbers to begin inspecting groups and feature counters with inspection cycle numbers to begin inspecting features based on said inspection criteria before performing a first inspection cycle in said sampling plan.

In another feature, said control module initializes an inspection cycle counter before performing a first inspection cycle in said sampling plan and increments said inspection cycle counter after completing each inspection cycle in said sampling plan.

In another feature, said control module increments group counters by frequencies to inspect said groups after inspecting said groups.

In another feature, said control module increments feature counters by a product of frequencies to inspect said features and frequencies to inspect said groups after inspecting said features.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a chart illustrating an exemplary sampling plan developed according the present invention;

DETAILED DESCRIPTION OF THE PREFERRED EMBODIMENTS

Figure 2:
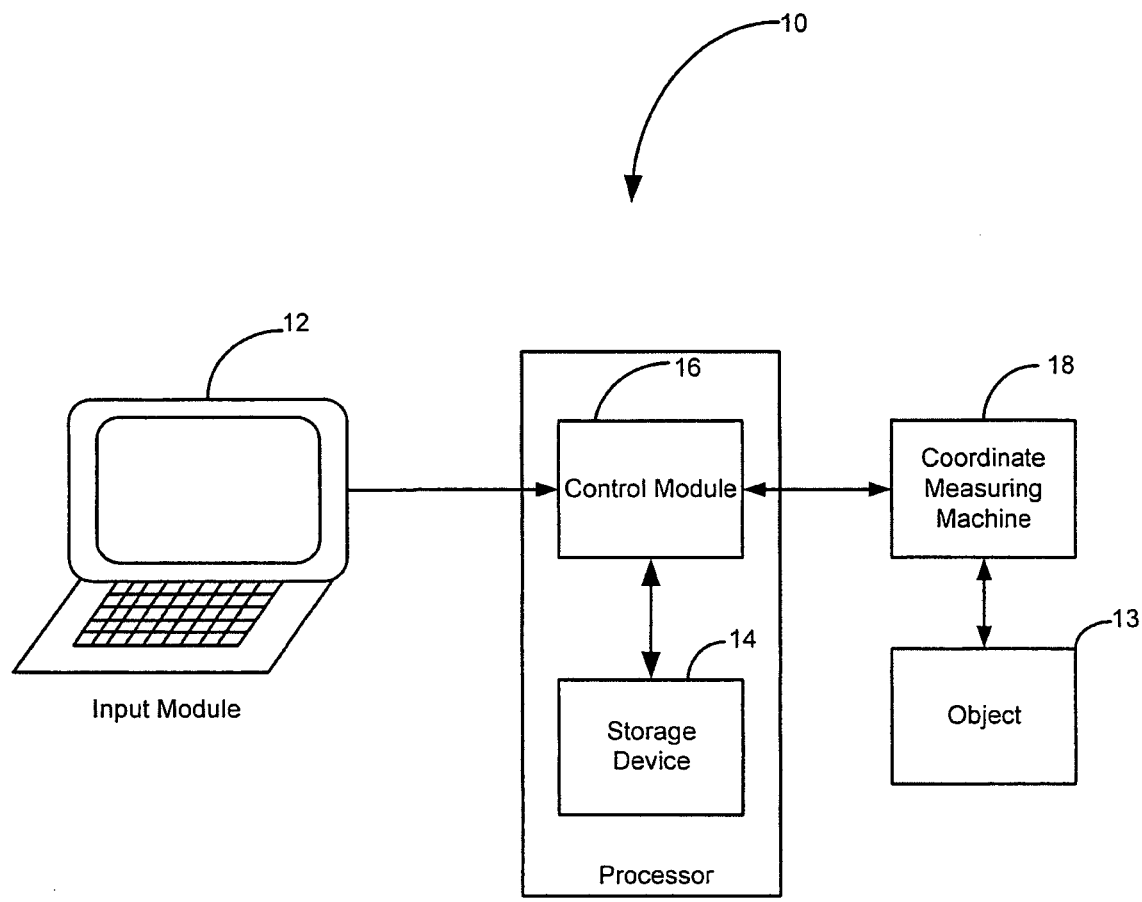
FIG. 2 is a functional block diagram of an exemplary system for developing flexible sampling plans and user interface for coordinate measuring machines according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and other suitable components that provide the described functionality.

Referring now to FIG. 1, a chart illustrating an exemplary sampling plan developed according to the present invention is shown. A manufactured object may have multiple features or elements that require testing to ensure quality of manufacture. The features may have different characteristics. For example, an object may have many holes that vary in dimensions such as diameter, depth etc. The holes are the features of the object, and the dimensions, such as diameter and depth, are the characteristics of the features.

Often, one tool may drill one set of holes in an object and another tool may drill the same set of holes in another object. Alternately, two tools may be utilized, each drilling half of a set of identical holes in the same object. Different tools, however, may have different tolerances. Consequently, one tool may drill a hole of a predetermined dimension slightly differently than the other tool. Therefore, it may be necessary to verify that all the holes conform to design specification.

The quality of manufacture of the holes may be ascertained by measuring one or more characteristics or dimensions of the holes using a coordinate measuring machine (CMM). Inspecting all holes may increase accuracy but doing so will decrease the inspection frequency of the CMM. Features, however, may be selectively inspected without sacrificing accuracy of measurement. For example, instead of inspecting the dimension of every hole in every object, the CMM may be programmed to inspect the holes selectively. The holes may be grouped. Inspections of groups and inspections of holes in the groups may be scheduled. Quality of samples of holes so inspected may be used to infer the quality of all the holes.

Generally, the features may be divided into groups depending on a common characteristic shared by the features. Alternately, the grouping may be based on the number or type of tools that manufactured the features. For example, the chart shows a total of 12 holes that are divided into three groups for illustrative purposes. The group of holes H101, H102, H103, and H104 may be tooled by Tool-100; the group of holes H201, H202, and H203 may be tooled by Tool-200; and the group of holes H301, H302, H303, H304, and H305 may be tooled by Tool-300. Alternately, all 12 holes may be drilled by a single tool, and yet may be grouped as above by using a common characteristic, such as diameter or depth of the holes, as a characteristic to be tested.

A sampling frequency may be set for a group and also for a feature or features within a group. For example, the group of holes H101, H102, H103, and H104 is sampled at a group frequency of 1 in 2. Thus, the group is inspected in every other inspection cycle starting at inspection cycle number 2 as indicated by the group start cycle set to 2 and then in inspection cycle numbers 4, 6, 8 etc.

The feature frequency is 1 in 3 for the holes H101, H102, and H103 and 1 in 1 for the hole H104. Thus, the holes H101, H102, and H103 are inspected in every third inspection cycle, and the hole H104 is inspected in every inspection cycle that is performed at the group frequency. The inspection starts at feature location 1, that is, by inspecting the first hole H101 in the group as indicated by the feature start cycle set to 1. Thus, the holes H101 and H104 are inspected in inspection cycle number 2. The holes H102 and H104 are inspected in inspection cycle number 4. The holes H103 and H104 are inspected in inspection cycle number 6. Subsequently, the holes H101 and H104 are inspected in inspection cycle number 8 and so on.

Similarly, the group of holes H201, H202, and H203 is sampled at a group frequency of 1 in 3. Thus, the group is inspected in every third inspection cycle starting at inspection cycle number 1 as indicated by the group start cycle set to 1 and then in inspection cycle numbers 4, 7, 10 etc. The feature frequency is 1 in 2 for holes H201 and H202 and 1 in 1 for hole H203. Thus, the holes H201 and H202 are inspected in every other inspection cycle, and the hole H203 is inspected in every inspection cycle that is performed at the group frequency.

The inspection starts at feature location 1, that is, by inspecting the first hole H201 in the group as indicated by feature start cycle set to 1. Thus, the holes H201 and H203 are inspected in inspection cycle number 1. The holes H202 and H203 are inspected in inspection cycle number 4. The holes H201 and H203 are inspected in inspection cycle number 7 and so on.

Finally, the group of holes H301, H302, H303, H304, and H305 is sampled at a group frequency of 1 in 1. Thus, the group is inspected in every inspection cycle starting at inspection cycle number 1 as indicated by the group start cycle set to 1. The feature frequency is 1 in 4 for the holes H301, H302, H303, and H304 and 1 in 1 for the hole H305.

The inspection starts at feature location 1, that is, by inspecting the first hole H301 in the group as indicated by the feature start cycle set to 1. Thus, the holes H301 and H305 are inspected in inspection cycle number 1. The holes H302 and H305 are inspected in inspection cycle number 2. The holes H303 and H305 are inspected in inspection cycle number 3. The holes H304 and H305 are inspected in inspection cycle number 4. Subsequently, the holes H301 and H305 are inspected in inspection cycle number 5 and so on.

Notably, in every inspection, the testing time is reduced by an amount depending on the group and feature frequencies. For example, only 4 of the 12 features are inspected in inspection cycle number 1 yielding a two-thirds saving in testing time. Only 2 of the 12 features are inspected in inspection cycle number 3 yielding a five-sixth saving in testing time. Only 6 of the 12 features are inspected in inspection cycle number 4 yielding a one-half saving in testing time and so on.

Consequently, the inspection efficiency is significantly improved when compared to the time required to inspect every feature in every inspection. Moreover, the user can manage the efficiency by developing new sampling plans by simply changing the inspection criteria. The user may input inspection criteria using a simple graphical user interface such as a screen showing menu selections or a terminal that enables the user to input simple commands. Importantly, the user need not know a computer programming language to develop a new sampling plan using this approach.

Referring now to FIG. 2, a system 10 for developing flexible sampling plans and user interface for coordinate measuring machines is shown. An input module 12, such as a touch screen, a keyboard, or a computer terminal, enables a user to input inspection criteria for inspecting multiple features of an object 13. The inspection criteria may include number of inspection cycles in a sampling plan, group frequency, feature frequency, starting inspection cycle numbers to begin testing of each group and feature etc.

A storage device 14, such as memory or a disk drive, stores the inspection criteria entered by the user. A control module 16 uses the inspection criteria and runs a sampling program that drives a coordinate measuring machine (CMM) 18. The CMM 18 inspects the feature or features of the object 13 according to the criteria specified by the user in the sampling plan.

The control module 16 assigns a group counter to each group. The user assigns a starting inspection cycle number, that is, the inspection cycle number in which the CMM 18 will begin testing that group. The control module 16 initializes the group counter with this starting inspection cycle number so that the CMM 18 will begin inspecting that group starting from that inspection cycle number. The control module increments the group counter for a group by the group frequency of that group after the CMM 18 inspects the group. Thus, the CMM 18 will next test that group in the correct inspection cycle number according to the inspection frequency of that group.

Similarly, the control module 16 assigns a feature counter to each feature. The user assigns a starting inspection cycle number, that is, the inspection cycle number in which the CMM 18 will begin testing that feature. The control module 16 initializes the feature counter with this starting inspection cycle number so that the CMM 18 will begin inspecting that feature starting from that inspection cycle number.

After the CMM 18 inspects the feature, the control module 16 increments the feature counter for the feature by a product of the feature frequency of that feature and the group frequency of the group to which the feature belongs. Thus, the CMM 18 will next test the feature in the correct inspection cycle number according to the inspection frequency of that feature.

An inspection cycle counter counts the number of inspection cycles performed by the CMM 18 and the control module 16 increments the inspection cycle counter after each inspection. The group counters, the feature counters, and the inspection cycle counter are stored in the storage device 14. Before each inspection, the control module 16 compares the group counters to the inspection cycle counter. The CMM 18 tests the groups with group counters that match the inspection cycle number in the inspection cycle counter during that inspection cycle.

Similarly, before each inspection, the control module 16 compares the feature counters of the features to the inspection cycle counter. The CMM 18 tests the features with feature counters that match the inspection cycle number in the inspection cycle counter during that inspection cycle.

Importantly, at any time after an inspection, the user can change the inspection criteria and create a new sampling plan if necessary to improve the efficiency of inspection. The user may enter the inspection criteria by using a graphical user interface such as a menu on a screen, or by entering simple commands from a computer terminal.

Although shown separately, at least one of the input module 12, the storage device 14, and the control module 16 may be implemented by a single device such as a computer or a processor. Alternately, at least one of the input module 12, the storage device 14, and the control module 16 may be incorporated in the CMM 18.

Figure 3:
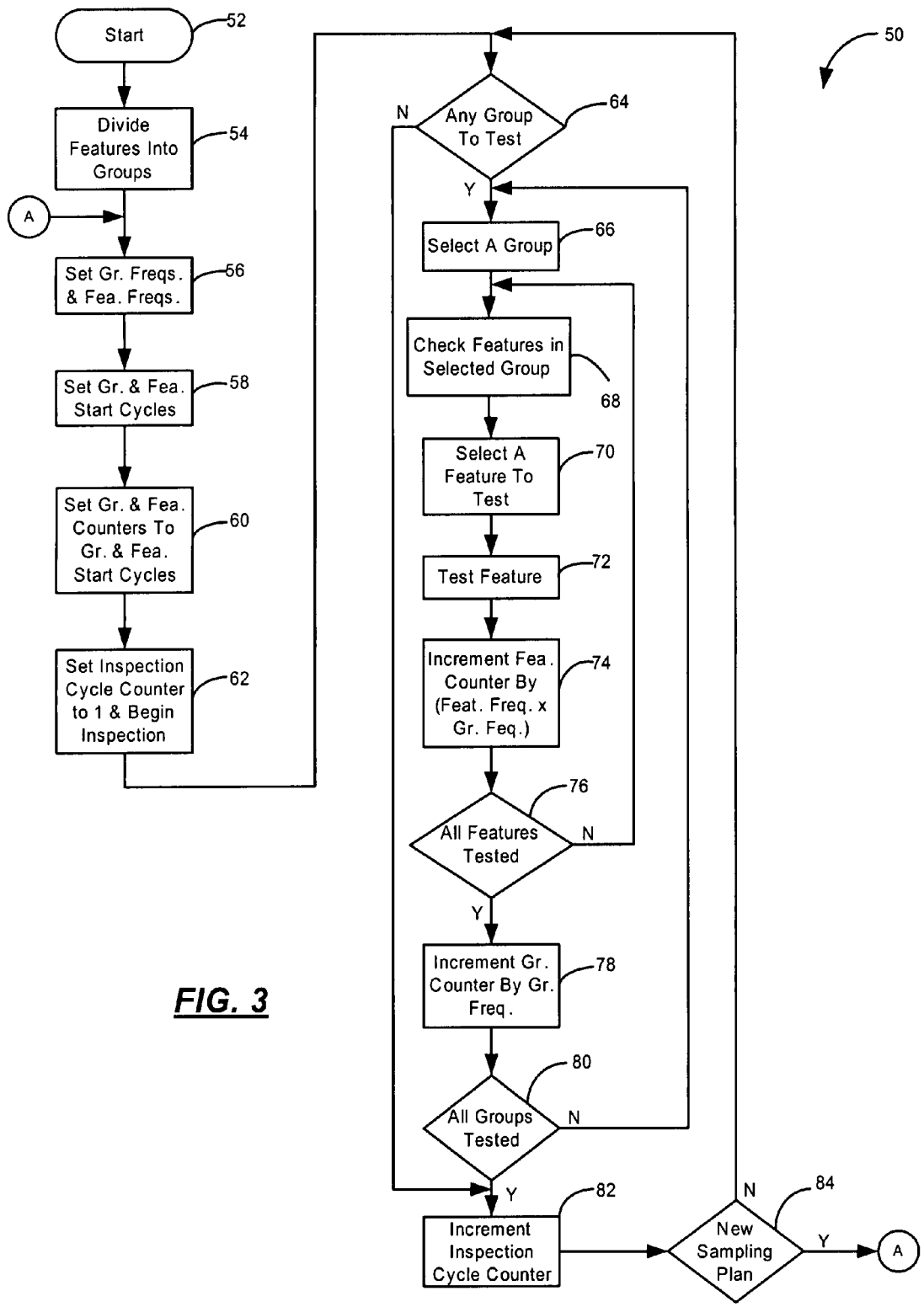
FIG. 3 is a flowchart of an exemplary method for developing flexible sampling plans and user interface for coordinate measuring machines according to the present invention.

Referring now to FIG. 3, a method 50 for developing flexible sampling plans and user interface for coordinate measuring machines is shown. The method 50 begins at step 52. In step 54, a user divides a set of features to test into groups. Features in a group share a common characteristic to be tested. In step 56, the user specifies the frequencies to test each group and also the frequencies to test each feature within each group.

In step 58, the user sets the start cycles for each group and for each feature within each group. That is, the user specifies the starting inspection cycle number in which the CMM 18 will begin testing a group and a feature within a group at the respective frequencies.

In step 60, the control module 16 initializes the group counters for each group with the respective specified start cycle numbers. Additionally, the control module initializes the feature counters for each feature of each group with the respective specified start cycle numbers. Thus, a group and a feature within a group are tested in the correct inspection cycle number. In step 62, the control module 16 sets the inspection cycle counter to 1 and begins inspection according to the sampling plan. The control module 16 stores the group counters, the feature counters, and the inspection cycle counter in the storage device 14.

In step 64, the control module checks if any group is to be tested during the inspection cycle number in progress by determining whether the group counters for any group match the inspection cycle number in progress. If no group is to be tested during that inspection cycle number, the control module 16 increments the inspection cycle counter in step 82.

If a group counter for any group matches the inspection cycle number in progress in step 64, then the control module 16 selects the group or groups for inspection in step 66. In step 68, the control module 16 checks the feature counters of all the features in the selected group. In step 70, the control module 16 determines the feature or features within the selected group that requires testing during the inspection cycle number in progress.

In step 72, the CMM 18 inspects the feature with feature counter matching the inspection cycle number in progress. In step 74, the control module 16 increments the feature counter for the tested feature by a number that is equal to the product of the feature frequency of the tested feature and the group frequency of the group that includes the tested feature. Thus, the tested feature is next inspected in the correct subsequent inspection cycle number according to the specified feature frequency for that feature.7

In step 76, the control module 16 determines whether all the features in the selected group are inspected. If not, then steps 68 through 74 are repeated for every feature to be inspected in the selected group during the inspection cycle number in progress. If all the features in the selected group are inspected, then the control module 16 increments the group counter for the inspected group by the group frequency of the inspected group in step 78. Thus, the tested group is next inspected in the correct subsequent inspection cycle number according to the specified group frequency for that group.

In step 80, the control module 16 determines whether all the groups that are to be inspected during the inspection cycle number in progress are inspected. If not, then steps 66 through 78 are repeated for each group that requires inspection during the inspection cycle number in progress.

If all the groups that require inspection during the inspection cycle number in progress are inspected, then the inspection cycle counter is incremented in step 82. In step 84, the control module 16 determines whether the user has changed any of the inspection criteria. If not, then the control module 16 performs the next inspection according to the current inspection criteria and repeats steps 64 through 82. If the user has changed any of the inspection criteria, then the control module 16 performs steps 56 through 82 according to the new inspection criteria.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A system for developing sampling plans, comprising:
   a coordinate measuring machine (CMM) that inspects X common features that are each included on N objects;
   an input module that is used to input inspection criteria to generate a sampling plan associated with inspections of said objects for said CMM and that is used to selectively modify said inspection criteria to develop multiple sampling plans;
   a storage device that stores said inspection criteria; and
   a control module that controls the CMM using said inspection criteria,
   wherein said inspection criteria comprises:
      inspection of a first one of said X common features on a M1 set of said N objects, and
      inspection of a second one of said X common features on a M2 set of said N objects that is different than said M1 set of said N objects, where said M1 set corresponds with at least one different one of said N objects than said M2 set and where X, M1, M2 and N are integers,
   wherein said inspection criteria comprises performing Y inspections on respective ones of said N objects, where Y is an integer that is less than or equal to N and where Y is greater than or equal to M1 and M2.

2. The system of claim 1 wherein said inspection criteria comprises a number of inspection cycles associated with inspections of said objects in said sampling plan, frequencies to inspect said X common features and groups of said common features, and inspection cycle numbers to begin inspecting said common features and said groups.

3. The system of claim 1 wherein said storage device stores group counters, feature counters, and an inspection cycle counter.

4. The system of claim 1 wherein said sampling plan comprises inspection cycles, and
wherein said control module initializes group counters with inspection cycle numbers to begin inspecting groups and feature counters with inspection cycle numbers to begin inspecting features based on said inspection criteria before performing a first inspection cycle in said sampling plan.

5. The system of claim 1 wherein said sampling plan comprises inspection cycles, and
wherein said control module initializes an inspection cycle counter before performing a first inspection cycle in said sampling plan and increments said inspection cycle counter after completing each inspection cycle in said sampling plan.

6. The system of claim 1 wherein said control module inspects groups of said X common features, and
wherein said control module increments group counters by frequencies to inspect said groups after inspecting said groups.

7. The system of claim 1 wherein said control module inspects groups of said X common features, and
wherein said control module increments feature counters by a product of frequencies to inspect said features and frequencies to inspect said groups after inspecting said features.

8. The system of claim 1 wherein said control module inspects a set of said X common features for a first object and inspects a different set of said X common features for a second object that is discrete from said first object via said CMM.

9. The system of claim 1 wherein said control module inspects a group of said X common features, and
wherein said control module inspects a first feature in said group during an inspection of a first object and a second feature in said group during an inspection of a second object.

10. The system of claim 1 wherein M1 divided by N corresponds with a first frequency of inspection of said first of said X common features and M2 divided by N corresponds with a second frequency of inspection of said second of said X common features, and
wherein said second frequency of inspection is less than said first frequency of inspection.

11. The system of claim 1 wherein inspection cycles that correspond with a first one of said X common features are mutually exclusive of inspection cycles that correspond with a second one of said X common features.

12. A method for developing sampling plans, comprising:
selecting common features of objects;
arranging said common features of said objects into groups having a common characteristic;
determining a number of inspection cycles associated with inspection of said objects in a sampling plan;
determining frequencies for inspecting said groups and said common features in said sampling plan across said inspection cycles;
selecting inspection cycle numbers to begin inspecting said groups and said common features in said sampling plan; and
selectively modifying said number of inspection cycles, said frequencies, and said inspection cycle numbers to begin inspecting said groups and said common features,
wherein an inspection cycle that corresponds with a first one of said common features is mutually exclusive of an inspection cycle that corresponds with a second one of said common features.

13. The method of claim 12 further comprising inspecting said groups and said common features at said frequencies starting at said inspection cycle numbers.

14. The method of claim 12 further comprising:
executing said number of inspection cycles; and
initializing group counters and feature counters with said inspection cycle numbers before performing a first of said number of inspection cycles in said sampling plan.

15. The method of claim 12 further comprising:
executing said number of inspection cycles; and
initializing an inspection cycle counter before performing a first of said number of inspection cycles in said sampling plan and incrementing said inspection cycle counter after completing each of said number of inspection cycles in said sampling plan.

16. The method of claim 12 further comprising:
inspecting said groups; and
incrementing group counters by said frequencies for said groups after inspecting said groups.

17. The method of claim 12 further comprising:
inspecting said common features; and
incrementing feature counters by a product of said frequencies for said common features and said frequencies for said groups after inspecting said common features.

18. A system for developing sampling plans, comprising:
a coordinate measuring machine (CMM) that inspects common features of objects;
an input module that is used to input inspection criteria to generate a sampling plan associated with inspections of said objects for said CMM; and
a control module that controls the CMM using said inspection criteria,
wherein said inspection criteria comprises inspection cycles associated with groups of said common features,
wherein each inspection cycle is associated with a different group dependent number of said objects,
wherein said inspection criteria comprises S1 inspection cycles associated with a first one of said common features and S2 inspection cycles associated with a second one of said common features, and
wherein said S1 inspection cycles and said S2 inspection cycles is associated with a different group dependent number of said objects, where S1 and S2 are integers.

19. The system of claim 18 wherein said CMM inspects X common features of N objects,
wherein said inspection criteria comprises S1 inspection cycles associated with a first one of said X common features and S2 inspection cycles associated with a second one of said X common features and S2 inspection cycles associated with a second one of said X common features, and
wherein said S1 inspection cycles and said S2 inspection cycles is associated with a different group dependent number of said N objects, where X, N, S1 and S2 are integers.

* * * * *